United States Patent
Zong et al.

(10) Patent No.: US 10,818,420 B2
(45) Date of Patent: Oct. 27, 2020

(54) ANTI-FOULING AND SPECIFIC BINDING SURFACE, DISPERSIONS COMPRISING PARTICLES HAVING SUCH SURFACES, AND METHODS OF MAKING THESE

(71) Applicant: DSM IP Assets, B.V., Te Heerlen (NL)

(72) Inventors: Mengmeng Zong, Echt (NL); Aylvin Jorge Angelo Athanasius Dias, Echt (NL); Edith Elisabeth M Van Den Bosch, Echt (NL); Jun Qiu, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 135 days.

(21) Appl. No.: 16/079,138

(22) PCT Filed: Mar. 3, 2017

(86) PCT No.: PCT/EP2017/055045
§ 371 (c)(1),
(2) Date: Aug. 23, 2018

(87) PCT Pub. No.: WO2017/149138
PCT Pub. Date: Sep. 8, 2017

(65) Prior Publication Data
US 2019/0066891 A1    Feb. 28, 2019

(30) Foreign Application Priority Data

Mar. 3, 2016 (EP) .................................. 16158481

(51) Int. Cl.
  H01F 1/26      (2006.01)
  C08G 73/02    (2006.01)
  C08L 79/02    (2006.01)

(52) U.S. Cl.
  CPC ........... *H01F 1/26* (2013.01); *C08G 73/0233* (2013.01); *C08L 79/02* (2013.01)

(58) Field of Classification Search
  CPC ........ H01F 1/26; C08L 79/02; C08G 73/0233
  See application file for complete search history.

(56) References Cited

U.S. PATENT DOCUMENTS

| 7,595,279 | B2  | 9/2009 | Wang et al. |
| 8,518,714 | B2  | 8/2013 | Soldo et al. |
| 8,772,373 | B2  | 7/2014 | Currie et al. |
| 2008/0185332 | A1* | 8/2008 | Niu ................. B01D 69/02 210/500.38 |

FOREIGN PATENT DOCUMENTS

| WO | 201302005 | 2/2013 |

OTHER PUBLICATIONS

Bai, Longchao, Preparation and characterizations of . . . , JMC-B, 2014-0922, ., V.2 No. 44, EP.
De La Rosa, Poly(2-oxazoline)s as materials for biomedical applications, J Mater Sci: Mater Med, 25:1211-1225 (2014).
Gieseler, et al., Poly(2-oxazoline) molecular brushes by grafting through of poly(2-oxazoline)methacrylates with aqueous ATRP, Polym. Chem., 6, 4678, (2015).
Li et al., Synthesis of Well-Defined Polymer Brushes Grafted onto Silica Nanoparticles via Surface Reversible Addition-Fragmentation Chain Transfer Polymerization, Macromolecules, 38:5929-5936 (2005).
Pidhatika, et al., Comparative Stability Studies of Poly(2-methyl-2-oxazoline) and Poly(ethylene glycol) Brush Coatings, Biointerphases 7:1, (2012).
Polymer-supported Alkyl monolayers on silica: synthesis and self-assembly of terminal functionalized poly(N-propionylethylenimine)s, Chem. Commun. 1025 (1996).
Rossegger, et al., Design Strategies for Functionalized Poly(2-oxazoline)s and Derived Materials, Polymers, 5, 966-1011 (2013).
Tao He, Efficient and robust coatings using . . . , Journal of Polymer Science Part A: Polymer Chemistry, Oct. 7, 2015, 275-283, V.54 No. 2.
Tauhardt, Lutz, Poly-2oaxzoline—functionalized surfaces . . . , CSR, Jul. 17, 2013, p. 7998, V.42 No. 20.
Tiberg, et al. "Immobilization of protein to surface-grafted PEO/PPO block copolymers," Colloid Polym. Sci. 270: 1188-1193 (1992).
Weber, at al., Preparation of Methacrylate End-Functionalized Poly(2-ethyl-2-oxazoline) Macromonomers, Designed Monomers and Polymers 12:149-165 (2009).
Yoshikawa, et al., "Grafting of polymers with controlled molecular weight onto inorganic fiber surface by termination of living polymer cation with amino group on the surface," Campos. Interfaces, 1998 vol. 6:5, 395-407.
International Search Report dated May 23, 2017.
Written Opinion of the International Search Authority dated Aug. 9, 2017.

* cited by examiner

*Primary Examiner* — Shafiqul Haq
(74) *Attorney, Agent, or Firm* — Kevin M. Ball

(57) ABSTRACT

Disclosed are anti-fouling and optionally specific binding surfaces, methods for forming anti-fouling and optionally specific binding surfaces, and molecules that may be useful for forming anti-fouling and optionally specific binding surfaces. The surfaces may be formed by employing a molecule comprising a poly(2-oxazoline) having functional groups. In an embodiment, the poly(2-oxazoline) comprises a carboxyl endgroup, an amine endgroup, an N-hydroxysuccinimide endgroup, an oxirane endgroup, an oxetane endgroup, or an isocyanate endgroup, which may enable attachment of a specific binding moiety to the poly(2-oxazoline). In an embodiment, the poly(2-oxazoline) molecule comprises a (meth)acrylate functionality that may allow for attachment to a surface comprising a moiety capable of nucleophilic conjugate addition.

11 Claims, No Drawings
Specification includes a Sequence Listing.

US 10,818,420 B2

ANTI-FOULING AND SPECIFIC BINDING SURFACE, DISPERSIONS COMPRISING PARTICLES HAVING SUCH SURFACES, AND METHODS OF MAKING THESE

Cross-Reference to Related Applications

This application is the US National Phase application of International Application No. PCT/EP2017/055045, filed 3 Mar. 2017, which designated the US and claims priority to European Application No. EP16158481.8, filed 3 Mar. 2016, the entire contents of each of which are hearby incorporated by reference.

FIELD

The invention relates to methods for forming anti-fouling and optionally specific binding surfaces, molecules useful for forming anti-fouling and optionally specific binding surfaces, particles having anti-fouling and optionally specific binding surfaces, dispersions comprising such particles, and uses thereof.

BACKGROUND

Anti-fouling surfaces are often required in the medical field to guard against non-specific protein adsorption and unwanted cellular adhesion to the surfaces in diagnostic systems or of medical devices. Fouling of surfaces may have serious consequences, such as bacterial infections, thrombosis, or poor accuracy in a diagnostic system. Particularly, anti-fouling surfaces show utility in the medical diagnostic area.

Various methods are known to render anti-fouling properties to a surface. One example is to coat the surface with certain proteins, most commonly BSA (bovine serum albumin). Another example is to attach certain polymer chains to a surface. See, for example, Tiberg, et al. "Immobilization of protein to surface-grafted PEO/PPO block copolymers," *Colloid Polym. Sci.* 270: 1188-1193 (1992).

Certain diagnostic methods make use of micro-particles or nano-particles that have surfaces with anti-fouling properties. These diagnostic devices typically comprise surfaces that have both anti-fouling and specific binding properties. By 'specific binding' is meant the ability of a specific binding moiety to selectively bind via one or more specific binding groups a desired species or molecule, which can be a biologically active species or molecule like a cell, protein, or enzyme. Specific binding capability of a surface can be imparted by attaching groups present on a specific binding moiety (in addition to one or more specific binding groups) to reactive groups present on the surface, thereby attaching the specific binding moiety to the surface. The combination of specific binding and anti-fouling properties is important because non-specific protein adsorption may cause undesired noise in diagnostic test results.

In U.S. Pat. No. 7,595,279, assigned to BioArray Solutions, Ltd., micro-particles having a covalently attached protein act as an attachment site for attaching nucleic acid molecules to the protein. The protein, for example BSA, is attached by, for example, reaction with the surface of a tosyl-activated micro-particle. Following such reaction, exposed reactive functional groups on the protein, such as amine, carboxyl, thiol, hydroxyl groups can further be utilized to covalently couple the oligonucleotide of interest using suitable chemistry. The formed micro-particles may have both anti-fouling and specific binding properties.

U.S. Pat. No. 8,772,373, assigned to DSM IP Assets BV, discloses a method of grafting hydrophilic polymer chains to particles to impart anti-fouling properties. In an exemplified embodiment, poly(ethylene glycol) trimethoxysilane is grafted to a $SiO_2$ nanoparticle having —OH surface functionality. The particles may comprise hydrophilic polymer chains comprising reactive groups. The reactive groups on a plurality of particles may be cross-linked with one another, such as with the aid of a suitable initiator, to form a cross-linked coating that may be hydrophilic and anti-fouling.

In "Synthesis of Well-Defined Polymer Brushes Grafted onto Silica Nanoparticles via Surface Reversible Addition-Fragmentation Chain Transfer Polymerization," Macromolecules 2005, 38, 5929-5936, Li et al. report that the grafting of pre-formed polymer chains to the surface of a particle, so-called "grafting to" processes, intrinsically result in low graft densities. They report improved graft densities using a reversible addition-fragmentation chain transfer polymerization (RAFT) technique wherein initiators are initially anchored to the surface, followed by polymerization of styrene or n-butyl acrylate from the surface, a so-called "grafting from" technique.

A further technique for imparting anti-fouling properties to a micro-particle is disclosed in U.S. Pat. No. 8,518,714, assigned to Beckman Coulter, Inc. A particle is incompletely coated with a support protein, such as BSA or ovalbumin. The support protein is used as a support for attachment of moieties capable of specifically binding desired molecules. A plurality of block-copolymer molecules are in contact with the surface of the micro-particle, the block-copolymer molecules preferably having a hydrophilic head group flanked by at least two hydrophilic tails.

Despite these known methods, there is a need for further and alternative methods of imparting anti-fouling character to a surface.

SUMMARY

The inventors have found that the known methods of providing anti-fouling functionality and optionally specific binding functionality to a surface may present several disadvantages. For example, there may be insufficient attachment of the molecule being attached to the surface, the method may require use of non-synthetic materials, the process may be cumbersome, or when the surface is a particle, the particles may agglomerate, settle, or stick to the walls of their container.

One or more of these disadvantages may be overcome by employing embodiments of the present invention. The invention employs a molecule comprising a poly(2-oxazoline) and at least one functional endgroup, preferably at least two different types of endgroups. Hereinafter, the molecule comprising a poly(2-oxazoline) may be referred to as a poly(2-oxazoline) molecule.

The poly(2-oxazoline) molecule comprises at least a (meth)acrylate, (meth)acrylamide, or thioester functional endgroup, which may allow for attachment to a surface comprising a moiety capable of nucleophilic conjugate addition, such as a primary amine group, via a conjugate addition reaction. In an embodiment, the poly(2-oxazoline) molecule has a (meth)acrylate endgroup, and is attached by a conjugate addition reaction of the (meth)acrylate and a moiety capable of nucleophilic conjugate addition on the surface.

The poly(2-oxazoline) molecule may further comprise a specific binding moiety, or alternatively attachment of a specific binding moiety may be done through one or more subsequent reactions with an endgroup of the poly(2-oxazoline) molecule (other than the (meth)acrylate, (meth)acrylamide, or thioester endgroup). In an embodiment, the poly(2-oxazoline) further comprises a carboxyl endgroup, an amine endgroup, an N-hydroxysuccinimide endgroup, an oxirane endgroup, an oxetane endgroup, or an isocyanate endgroup, which endgroup may optionally be protected with a protecting group, and which endgroup enables attachment of a specific binding moiety to the poly(2-oxazoline).

DESCRIPTION

The inventors have found that known methods of providing anti-fouling functionality, and optionally specific binding functionality, to a surface may present several disadvantages.

Firstly, the existing methods may result in insufficient attachment of the molecules to the surface. Insufficient attachment to the surface may cause debonding of the molecule from the surface when further reacting the molecule, for example when attempting to attach a specific binding moiety to the attached molecule. Further, there may be too few molecules attached or the attached molecules may be non-uniformly distributed over the surface. Insufficient attachment may thus result in insufficient anti-fouling or specific binding properties. Moreover, there may be unattached molecules present in the solution, which may require further steps to purify a dispersion of particles or increase noise in a diagnostic method.

Secondly, many of the existing methods rely on non-synthetic proteins, such as BSA. Such proteins are usually animal-derived. Any modification of the chemical structure or purity of the protein may require that a diagnostic test method be tuned to match the modified protein. Additionally, the cost may be higher than synthetic materials.

Thirdly, the process to render a surface anti-fouling may be cumbersome. In certain commercial applications, the attachment of molecules to impart anti-fouling or specific binding capability to a surface, e.g. the surface of a magnetic particle, is performed at a customer site. Therefore, a simple and robust process is preferred. Furthermore, certain processes, such as the RAFT process, may result in a high quality anti-fouling surface, but the process may be insufficiently robust for use at commercial scale, leading to increased cost and potential quality issues.

Fourthly, particles formed using prior methods or materials may agglomerate, stick to the walls of their container, or undesirably settle. This may reduce the sensitivity or the useful life of the diagnostic device.

Known methods of functionalizing a surface by attaching a poly(2-oxazoline) are reviewed by Tauhardt et al. in "Poly(2-oxazoline) functionalized surfaces: from modification to application, *Chem. Soc. Rev.* 2013, 42, 7998. A more specific method wherein an alkoxy silane-functional poly(2-ethyl-2-oxazoline) is grafted to a hydroxyl functional surface is described by Jordan et al., in "Polymer-supported alkyl monolayers on silica: synthesis and self-assembly of terminal functionalized poly(N-propionylethylenimine)s", *Chem. Commun.*, 1025-1026 (1996).

In a further method, the cationic ring opening polymerization of 2-oxazoline monomers is quenched using an amine group; see Yoshikawa et al., "Grafting of polymers with controlled molecular weight onto inorganic fiber surface by termination of living polymer cation with amino group on the surface," *Compos. Interfaces,* 1998 vol. 6:5, 395-407. Both methods may have various disadvantages in the lack of stability of the poly(2-oxazoline) prior to attachment to the surface. Specifically, when a poly(2-oxazoline) undergoing living cationic ring opening polymerization is present, the presence of water, such as water present in ambient air, will terminate the cationic ring opening polymerization, resulting in a poly(2-oxzazoline) with OH end-functionality rather than attaching to a surface via the moiety capable of nucleophilic conjugate addition present on the surface. The supply of such unstable poly(2-oxazoline)s thus may have certain commercial disadvantages. Secondly, the linkage from the poly(2-oxazoline) to the surface may not be sufficiently stable under certain reaction conditions. Another method of making an anti-fouling coating on a surface is described by Tao et al. ("Efficient and robust coatings using poly(2-methyl-2-oxazoline) and its copolymers for marine and bacterial fouling prevention", *J. Polym. Sci. Part A: Polym. Chem.*, vol. 54(2), 275-283, (2015)). Herein a silica surface is first provided with pending methacrylate groups by reaction with a silane compound. A coating is then formed by applying a macromonomer poly(2-methyl-2-oxazoline) dimethacrylate, prepared via living cationic ring-opening polymerization and endcapping with methacrylic acid, to said modified surface; followed by reacting methacrylate groups of the macromonomer and of the modified surface with UV radiation to result in a crosslinked polymer chemically attached to the surface. Optionally, a cationic comonomer is added with the macromonomer to result in a copolymer coating.

Use of an oligo(2-methyl-2-oxazoline) methacrylate in making an anti-fouling coating on a silicon surface is described by Bai et al. in "Preparation and characterizations of poly(2-methyl-2-oxazoline) based antifouling coating by thermally induced immobilization", *J. Mater. Chem. B,* 2014, 2, 7785. In this method the oligo(2-methyl-2-oxazoline) methacrylate is copolymerized with glycidyl methacrylate on the surface of a silicon/glass wafer, the epoxy groups binding the polymer to the surface via reaction with hydroxyl groups. The coating comprising grafted comb-like copolymer showed decreased bio-fouling adsorption, but the document does not address specific binding of species.

Surprisingly, the inventors have found that appropriate anti-fouling properties may be imparted to a surface when the poly(2-oxazoline) is attached via a conjugate addition of a (meth)acrylate, (meth)acrylamide, or thioester endgroup present on the poly(2-oxazoline) molecule and a moiety capable of nucleophilic conjugate addition on the surface, while still enabling specific binding of a desired species or molecule via another functional group of the the poly(2-oxazoline) molecule. This surface modification method also allows for a more robust attachment process, which can also be performed at a customer site.

Poly(2-oxazoline) Molecule

A poly(2-oxazoline) molecule is a molecule that comprises a poly(2-oxazoline) chain, formed by 2-oxazoline monomers undergoing living cationic ring-opening polymerization. A 2-oxazoline monomer has the following formula:

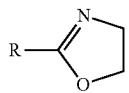

wherein R is selected from the group consisting of H, CN, NO₂, alkyl, alkenyl, aryl, heteroaryl and heterocyclic groups. Preferred 2-oxazoline monomers are alkyl oxazolines, such as 2-methyl-2-oxazoline, 2-ethyl-2-oxazoline, 2-isopropyl-2-oxazoline, 2-nonyl-2-oxazoline, and 2-phenyl-2-oxazoline. Particularly preferred are poly(2-oxazoline)s formed from 2-methyl-2-oxazoline or 2-ethyl-2-oxazoline.

An initiator is typically used to initiate the living cationic ring-opening polymerization of one or more 2-oxazoline monomers. In an embodiment, the initiator creates some functionality on the poly(2-oxazoline), such as a hydroxyl, vinyl, carboxyl, amine, N-hydroxysuccinimide, oxirane, oxetane, isocyanate, (meth)acrylate, (meth)acrylamide, or thioester functionality. Examples of suitable initiators are alkyl sulfates, alkyl sulfonates, and compounds comprising halogen leaving groups (preferably Cl or Br) attached to a low molecular weight (<500 g/mol) molecule. Preferred initiators are dimethylsulfate, methyl p-toluenesulfonate, methyltriflate, 1,4-dibromo-2-butene, and dibromobutane ditosylate. In an embodiment, the low molecular weight molecule comprises a functional group that does not interfere with the 2-oxazoline polymerization and is available for further reaction after completion of the polymerization. An example of such a functional group is a vinyl group, such as (meth)acrylate, (meth)acrylamide, or thioester. Preferred compounds comprising halogen leaving groups attached to a low molecular weight molecule are (meth)acryloyl chloride, (meth)acryloyl bromide, and vinyl benzylchloride.

After initiation, the living cationic ring-opening polymerization proceeds by consuming 2-oxazoline monomers present in the reaction medium. The molecular weight (or molar mass) of the poly(2-oxazoline) may be controlled by adjusting the amount of initiator, the amount of 2-oxazoline monomer, and the reaction conditions. The reaction may proceed in a solvent or in the melt.

A terminating agent serves the function of end-capping a poly(2-oxazoline). The termination agent may terminate the living cationic ring-opening polymerization of the poly(2-oxazoline) molecules or may be introduced after the polymerization is complete, for example due to there being no remaining 2-oxazoline monomers available to be polymerized.

In an embodiment, the terminating agent creates some functionality on the poly(2-oxazoline) to form a poly(2-oxazoline) macromer, such as a hydroxyl, vinyl, carboxyl, amine, N-hydroxysuccinimide, oxirane, oxetane, isocyanate, (meth)acrylate, (meth)acrylamide, or thioester functionality. Termination agents are, for example, water, alkyl amines, such as diallylamine or diethanolamine, (meth)acrylic acid, or 3-aminopropyl vinyl ether.

In an embodiment, a poly(2-oxazoline) molecule has a functional group on one end of a poly(2-oxazoline) backbone. In an embodiment, a poly(2-oxazoline) molecule has functional groups on two ends of a poly(2-oxazoline) backbone. In an embodiment, at least one end of a poly(2-oxazoline) molecule comprises two or more functional groups. In an embodiment, at least one end of a poly(2-oxazoline) molecule comprises two functional groups. In an embodiment, the poly(2-oxazoline) molecule has a (meth)acrylate, (meth)acrylamide or thioester functional group at a first end, and a hydroxyl endgroup, a carboxyl endgroup, an amine endgroup, an N-hydroxysuccinimide endgroup, an oxirane endgroup, an oxetane endgroup, or an isocyanate endgroup at a second end. In an embodiment, the poly(2-oxazoline) molecule has a (meth)acrylate functional group at a first end, and carboxyl endgroup, an amine endgroup, an N-hydroxysuccinimide endgroup, an oxirane endgroup, an oxetane endgroup, or an isocyanate endgroup at a second end. In an embodiment, this functional endgroup at the second end is protected by a protecting group.

In an embodiment, the poly(2-oxazoline) molecule comprises a protecting group wherein amine may result after deprotection. Exemplary groups comprising a protecting group wherein amine may result after deprotection are tert-butyl carbamate, benzyl carbamate, phthalimide, p-toluenesulfonamide, and 9-fluorenylmethyl carbamate. Exemplary groups comprising a protecting group wherein carboxyl may result after deprotection are methyl ester, t-butyl ester, benzyl ester, and S-t-butyl ester.

In an embodiment, the poly(2-oxazoline) group of the poly(2-oxazoline) molecule has a number average molecule weight Mn of from 500 to 20,000 g/mol, from 500 to 15,000 g/mol, from 500 to 10,000 g/mol, or from 500 to 5000 g/mol. Mn is measured by GPC in THF.

In an embodiment, a poly(2-oxazoline) molecule is a compound according to Formula (1):

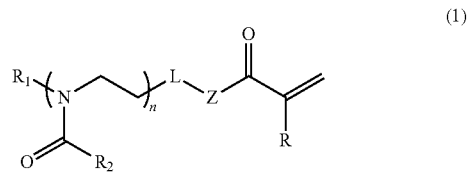

wherein n is from 2 to 200; R is H or CH₃; R₁ is H or comprises a carboxyl endgroup, an amine endgroup, an N-hydroxysuccinimide endgroup, an oxirane endgroup, an oxetane endgroup, an isocyanate endgroup, a tert-butyl carbamate endgroup, a benzyl carbamate endgroup, a phthalimide endgroup, a p-toluenesulfonamide endgroup, a 9-fluorenylmethyl carbamate endgroup, a methyl ester endgroup, a t-butyl ester endgroup, a benzyl ester endgroup, a S-t-butyl ester endgroup, or comprises a specific binding moiety; R₂ is CH₃ or CH₂CH₃; L is an optional linking group; and Z is NH, O, or S. In an embodiment, n is from 2 to 100, R is H, R₂ is CH₃, L is absent, and Z is O. In an embodiment, n is from 2 to 100, R is H, R₂ is CH₂CH₃, L is absent, and Z is O.

L is an optional linking group. In an embodiment, the linking group L is present and is oligomeric or polymeric. In an embodiment, the linking group L comprises C₂-C₂₀ alkyl, poly(ethylene oxide), poly(propylene oxide), copolymers of ethylene oxide and propylene oxide, polydimethylsiloxane, poly(acrylic acid), poly(methacrylic acid), (co)polymers of vinylpyrrolidone, (co)polymers of 2-hydroxyethyl(meth)acrylate, (co)polymers of glycidyl (meth)acrylate, phosphorylcholine derivatives, heparins, or combinations of these. In an embodiment, the number average molecular weight of the linking group L is from 100 to 1000 g/mol.

R₁ may comprise a linking group. In an embodiment, R₁ comprises a linking group. In an embodiment, R₁ comprises a linking group and L is present.

In an embodiment, a poly(2-oxazoline) molecule is a compound according to Formula (2):

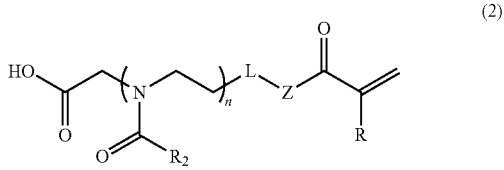

(2)

wherein n is from 2 to 200; R is H or CH$_3$; R$_2$ is CH$_3$ or CH$_2$CH$_3$; L is an optional linking group; and Z is NH, O, or S. In an embodiment, n is from 2 to 100, R is H, R$_2$ is CH$_3$, L is absent, and Z is O. In an embodiment, n is from 2 to 100, R is H, R$_2$ is CH$_2$CH$_3$, L is absent, and Z is O.

Specific Binding Moiety

In an embodiment, the poly(2-oxazoline) molecule comprises a specific binding moiety. The specific binding moiety may be present on the poly(2-oxazoline) molecule before the poly(2-oxazoline) molecule is grafted to the surface. However, in an embodiment the poly(2-oxazoline) molecule is first grafted to the surface and the specific binding moiety is subsequently attached to the poly(2-oxazoline) molecule via a hydroxyl endgroup, a carboxyl endgroup, an amine endgroup, an N-hydroxysuccinimide endgroup, an oxirane endgroup, an oxetane endgroup, or an isocyanate endgroup present on the poly(2-oxazoline) molecule. The result is a surface comprising the poly(2-oxazoline) molecule, with the poly(2-oxazoline) molecule comprising a specific binding moiety. Optionally, the carboxyl endgroup, amine endgroup, N-hydroxysuccinimide endgroup, oxirane endgroup, oxetane endgroup, or isocyanate endgroup may be obtained only after a deprotection step to remove a protecting group. The deprotection step may be performed before or after grafting of the poly(2-oxazoline) molecule to the surface.

In an embodiment, the specific binding moiety is attached directly to a poly(2-oxazoline) group. In an embodiment, the specific binding moiety is attached to a spacer that is attached to a poly(2-oxazoline) group. The optional spacer group may be provided in the poly(2-oxazoline) molecule in order to, for example, increase the separation between the specific binding moiety and a linking group. The spacer group may be oligomeric or polymeric in nature; for example the spacer group may comprise repeating monomer units of C$_2$-C$_{20}$ alkyl, ethylene oxide, propylene oxide, copolymers of ethylene oxide and propylene oxide, polydimethylsiloxane, (co)polymers of (meth)acrylic acid, (co)polymers of vinylpyrrolidone, (co)polymers of 2-hydroxyethyl(meth)acrylate, (co)polymers of glycidyl (meth)acrylate, phosphorylcholine derivatives, heparins, and combinations of these.

The specific binding moiety comprises one or more specific binding groups, for example at least two or three specific binding groups, to bind a desired species or molecule. The specific binding moiety may comprise at least one of an optional linking group and an optional spacer group. A single specific binding moiety may serve multiple purposes. For example, a specific binding moiety may have a specific binding group that serves as both a linking group and a spacer group. The specific binding moiety may have one or more linking groups or no linking groups per molecule, one or more specific binding groups per molecule, and optionally one or more spacer groups per molecule. The specific binding group of the specific binding moiety is a functional group capable of binding to a desired species or molecule, preferably with high selectivity and high specificity. Exemplary species or molecules include a cell, an antibody, an aptamer, a receptor, a hormone, an enzyme, an oligonucleotide or polynucleotide, synthetic compounds such as drugs or imaging agents (e.g. an MRI contrast agent), an antigen, a peptide, a fatty acid, or a protein. Other preferred species are characteristic components of bacteria, like toxic bacteria that may be present in food.

The specific binding group may comprise an antibody, a binding fragment of an antibody, a receptor, a ligand of a receptor, a hormone, a receptor of a hormone, an enzyme, a substrate of an enzyme, a single stranded oligonucleotide, a double stranded oligonucleotide, a single stranded polynucleotide, a double stranded polynucleotide, an antigen, a peptide, or a protein. In an embodiment, the specific binding moiety comprises biotin, streptavidin, avidin, neutravidin, or a derivative thereof.

The specific binding group can comprise an adhesive peptide fragment. Several such adhesive peptide fragments are known in the art. A particular peptide fragment can be tested for its binding ability or adhesive capacity according to standard techniques. Examples of such peptide sequences include but are not limited to: Arg-Gly-Asp (RGD)-containing peptide sequences; Tyr-Ile-Gly-Ser-Arg (YIGSR)-containing peptide sequences; and/or Ile-Lys-Val-Ala-Val (IKVAV)-containing peptide sequences.

Arg-Gly-Asp (RGD)-containing peptide sequences are widely recognised as cell recognition motifs. Further details about different RGD-containing peptides that can be used in this invention and their specific properties are described in Hersel et al., Biomaterials 2003, 24(24), 4385-4415. Examples of RGD-containing peptide sequences that could be used in the present invention include but are not limited to: RGD, RGDS, GRGDS, GRGD, YRGDS, YRGDG, YGRGD, GRGDSP, GRGDSG, GRGDSY, GRGDSPK, CGRGDSY, GCGYGRGDSPG, and RGDSPASSKP. In one preferred embodiment of the present invention, the peptide sequence is Gly-Arg-Gly-Asp-Ser (GRGDS).

Tyr-Ile-Gly-Ser-Arg (YIGSR)-containing peptide sequences are found on the B1 chain of laminin, and promote epithelial cell attachment (Graf et al., *Biochemistry* 1987, 26(22), 6896-6900).

Ile-Lys-Val-Ala-Val (IKVAV)-containing peptide sequences are found on the A chain of laminin, and have been reported to promote neurite outgrowth (Tashiro et al., *Journal of Biological Chemistry* 1989, 264(27), 16174-16182).

The specific binding group can comprise repeating peptide sequences (peptide monomers). The repeating peptide sequences may be homopolymers consisting of a single repeating peptide monomer or alternatively may be heteropolymers consisting of two or more different repeating peptide monomers or subunits. In general, the specific binding group may consist of 2-100 peptide monomers, usually 2-50, preferably 3-15. Each peptide monomer may range in length from 2-40 amino acid residues, usually 2-30, preferably 2-10.

The peptide monomers may be chemically synthesised or produced by means of recombinant genetics. Similarly, the specific binding groups comprising repeating peptide sequences may be produced by chemically linking peptide monomers together or alternatively they can be recombinantly expressed. In one specific embodiment of the invention, the specific binding group comprises repeating peptide sequences of RGD-containing peptide sequences.

The optional linking group of the specific binding moiety is a functional group capable of reaction with a functional group present on the poly(2-oxazoline) molecule. The linking group may be at least one functional group selected from: acrylates, methacrylates, epoxies, alcohols, carboxylic acids, carboxylic anhydrides, amines, amides, acrylamides, hydroxyalkylamides, dicyandiamides, hydrazinamides, isocyanates, carbodiimides, anhydrides, thiols, acyl groups, and vinyl groups.

Applications

In an embodiment, a surface is functionalized by reacting a poly(2-oxazoline) molecule as described herein above with a moiety capable of nucleophilic conjugate addition present on the surface. In an embodiment, the moiety capable of nucleophilic conjugate addition comprises a primary amine, SH, secondary amine, a carbon-carbon double bond, or OH. In an embodiment, the moiety capable of nucleophilic conjugate addition comprises a primary amine, SH, or secondary amine. In an embodiment, the moiety capable of nucleophilic conjugate addition on the surface comprises a primary amine.

The surface is preferably the surface of a particle. In an embodiment, the particle has a mean particle diameter of from 100 nm to 10 μm. In an embodiment, the particle has a mean particle diameter of from 100 nm to 5 μm. Mean particle diameter is measured by laser diffraction. In an embodiment, the surface is a surface of a magnetic particle. The magnetic particle may comprise, for example, a magnetic core provided with an inorganic shell, like a silica shell. In an embodiment, the magnetic particle is substantially spherical.

In an embodiment, the poly(2-oxazoline) molecule is attached to the moiety capable of nucleophilic conjugate addition on the surface via a conjugate addition reaction. In an embodiment, the reaction involves a conjugate addition of a (meth)acrylate group, (meth)acrylamide group, or thioester group of the poly(2-oxazoline) molecule and a moiety capable of nucleophilic conjugate addition on the surface. In an embodiment, the reaction involves a conjugate addition of a (meth)acrylate group, (meth)acrylamide group, or thioester group on the poly(2-oxazoline) molecule and a primary amine group on the surface. Such reaction is also referred to as a Michael addition.

In an embodiment, a surface comprises one or more compounds according to Formula (3):

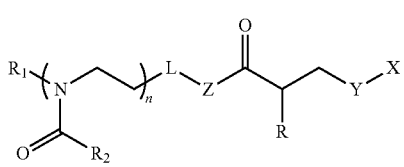

(3)

wherein n is from 2 to 200; R is H or $CH_3$; $R_1$ is H or comprises a hydroxyl endgroup, a carboxyl endgroup, amine endgroup, N-hydroxysuccinimide endgroup, oxirane endgroup, oxetane endgroup, isocyanate endgroup, a tert-butyl carbamate endgroup, a benzyl carbamate endgroup, a phthalimide endgroup, a p-toluenesulfonamide endgroup, a 9-fluorenylmethyl carbamate endgroup, a methyl ester endgroup, a t-butyl ester endgroup, a benzyl ester endgroup, or a S-t-butyl ester endgroup, or comprises a specific binding moiety; $R_2$ is $CH_3$ or $CH_2CH_3$; L is an optional linking group; Y is NH, O, or S; Z is NH, O, or S; and X represents the surface of a magnetic particle or a group attached to the surface of a magnetic particle. In an embodiment, n is from 2 to 100, R is H, $R_2$ is $CH_3$, L is absent, Z is O, Y is NH, O, or S, and X represents the surface of a magnetic particle or a group attached to the surface of a magnetic particle. In an embodiment, n is from 2 to 100, R is H, $R_2$ is $CH_3CH_3$, L is absent, Z is O, Y is NH, O, or S, and X represents the surface of a magnetic particle or a group attached to the surface of a magnetic particle.

In an embodiment, a method of attaching a polymer chain to a surface comprises the steps of providing a surface comprising a moiety capable of nucleophilic conjugate addition, providing a compound according to formula (1) or (2), and reacting the (meth)acrylate group of the compound according to formula (1) or (2) via a conjugate addition reaction with the moiety capable of nucleophilic conjugate addition the surface, thereby attaching the polymer chain to the surface. In an embodiment, the method may further comprise the step of creating functionality on the polymer chain by forming a functional group at the other end of the polymer chain. The method may further comprise the step of attaching a specific binding moiety to the polymer chain via a carboxyl, amine, N-hydroxysuccinimide, oxirane, oxetane, or isocyanate endgroup present on the polymer chain.

Potential applications of the anti-fouling surfaces capable of specific binding and as made with the methods as described herein are in sensors. Such sensors may have various uses involving the separation, purification, identification, or measurement of various species. The sensor is preferably configured to sense the presence of a biological species or a biologically active species like a drug. Further potential applications are for new drug screening, labelling of cells or bacteria, cell sorting, markers for magnetic resonance imaging, medical diagnostics, toxin detection in food, and purification. In an embodiment, a sensor comprises a magnetic particle functionalized with a method according to the invention. The sensor is preferably a medical sensor, such as a medical diagnostic device. The medical diagnostic device may be capable of measuring the concentration of a substance, for instance by conducting an assay.

The invention may also be employed to allow selective cell binding for subsequent manipulation in a bioreactor for tissue engineering or cell based therapies. In such a process, magnetic particles are provided. The magnetic particles comprise polymer chains attached to the surface of the magnetic particles. The polymer chains comprise a specific binding moiety with at least one specific binding group that is capable of attachment to a cell. Cells are subsequently selectively bound to the specific binding group. The magnetic particles with cells attached are then placed in a magnetic bioreactor. In the bioreactor the cells are exposed to magnetically induced stress and strain to achieve mechanically induced cell differentiation. In an embodiment, a tissue culture matrix comprises a dispersion of magnetic particles, the magnetic particles comprising a polymer chain, the polymer chain comprising a specific binding group. In an embodiment, the tissue culture matrix is subsequently exposed to magnetic force bioreactors so as to achieve controlled cell differentiation.

Experiments

Characterization of Anti-Fouling Properties Magnetic particles with primary amine functionality on the surface of the particle are provided (SiMag-Amine, obtained from Chemicell GmbH). The particles have a magnetic core surrounded by a silica shell and $NH_2$ surface functionality. The hydrodynamic diameter is approximately 1 μm and the amination degree approximately 350 μmol $NH_2$/g. The particles were functionalized according to one of two different methods: either by quenching the living cationic ring opening polymerization of poly(2-ethyl-2-oxazoline) with the amine functional particle surface, or by grafting to the particle surface via a Michael addition reaction using a compound according to Formula (1).

Functionalization of Magnetic Particles by Quenching the Living Cationic Ring Opening Polymerization of Poly(2-ethyl-2-oxazoline)

The living cationic ring opening polymerization of 2-ethyl-2-oxazoline monomers was initiated by methyl p-toluenesulfonate in acetonitrile. Methyl p-toluenesulfonate (0,213 g or 0,438 g), ethyl-oxazoline (3.96 g, 4 mmol) and acetonitrile (5.96 mL) were transferred to pre-dried microwave vials under nitrogen. The vial was capped and placed in the autosampler of the microwave. After 10 s pre-stirring, the reaction solution was heated to 140° C. and left to react for 15 min. The vial was cooled to the room temperature after completion. A hydroxyl group was introduced on the polymer chain by adding 5 ml DI water into the vial and stirred overnight.

The desired molecular weight was obtained by controlling the concentration of 2-ethyl-2-oxazoline monomers and initiator.

The living cationic ring opening polymerization was terminated by quenching with the amine functional magnetic particles. 40 mg of magnetic particles were added to the mixture containing PDX-1800 or PDX-3600, thereby forming magnetic particles with either PDX-1800 or PDX-3600 attached thereto.

The resulting mixture was then placed in ultrasonic bath at a 50° C. for 6 hours and subsequently cooled to room temperature, 5 ml of the reaction mixture was then transferred into two falcon tubes. An additional 2.5 ml of methanol was added to the reaction mixture. The reaction mixture was then vortexed for 30 seconds to re-suspend the particles. The magnetic particles were precipitated by centrifuging at 5000 rpm for 15 min at room temperature. The supernatant was discarded. The particles were re-dispersed in 5 ml ethanol, then the steps of vortexing and precipitating repeated at least 3 times to wash the magnetic particles.

5 ml of 5% $Na_2CO_3$ solution was then added to the magnetic particles, and the magnetic particles were dispersed by vortexing. The magnetic particles were precipitated by centrifuging at 5000 rpm for 15 min at room temperature. These steps were repeated 2 times, then 5 ml of DI water was added and washing steps were repeated for 3 times.

Finally, 1 ml of DI water was added to the magnetic particles. The particles are stored at 4° C.

The poly(2-ethyl-2-oxazoline)s obtained are shown in Table 1.

TABLE 1 poly(2-ethyl-2-oxazoline)s obtained

| Sample ID | DP ($^1$H NMR) | Mn (Da) | PDI |
|---|---|---|---|
| POX-1800 | 20 | 1800 | 1.1 |
| POX-3600 | 46 | 3600 | 1.2 |

DP was determined by $^1$H NMR as follows. $^1$H NMR spectra were obtained on a Bruker Avance 300 MHz Ultrashield NMR; samples were prepared by dissolving 5 to 25 mg of sample in 1 ml $CDCl_3$. Degree of polymerization (DP) was determined by comparison of the integral of the $CH_3$ peak from initiator (1.5 ppm) and polymer backbone (3-3.8 ppm). $^1$H NMR ($CDCl_3$, 200 MHz): δ=1.0 (POx, $CH_3$), 2.3 (POx, $CH_2CH_3$), 3.0 ($CH_3$—$NCH_2CH_2$) 3.5 (POx, $CH_2CH_2N$—CO-Et).

Mn was determined by GPC equipped with RI detector. Samples were dissolved in THF at a concentration of approximately 5 mg/ml and were run at a flow rate of 1 ml/min at 50° C. The molecular weights were calibrated to a narrow polystyrene standard calibration curve, using Waters Empower software.

Functionalization of Magnetic Particles by Michael Addition tert-Butyl bromoacetate (0.71 g, 3.64 mmol), ethyl-oxazoline (3.96 g, 4 mmol) and acetonitrile (5.96 mL) were transferred to pre-dried microwave vials under nitrogen. The vial was capped and placed in the autosampler of the microwave. After 10 s pre-stirring, the reaction solution was heated to 140° C. and left to react for 15 min. The vial was cooled to room temperature after completion. Acrylic acid (0.39 g, 1.5 equilibrium), triethylamine (0.73 g, 2 equilibrium) were added to the reaction mixture that contained the living oxazoline chains, then the mixture was heated to 80° C. for 15 hr. The mixture was cooled to room temperature, and the solvent was evaporated under vacuum. The residue was dissolved in 50 mL of dichloromethane and extracted twice with a 0.5 M sodium bicarbonate solution (50 mL×2) and once with brine. The organic layer was dried over sodium sulphate, the product was collected by evaporation. The degree of polymerization and the functionality of acrylate groups were determined by $^1$H NMR in $CDCl_3$. $^1$H NMR ($CDCl_3$, 200 MHz): δ=1.0 (POx, $CH_3$), 1.5 (9H, tBu-H), 2.3 (POx, $CH_2CH_3$), 3.5 (POx, $CH_2CH_2N$—CO-Et), 3.9 (2H, $CH_2COOtBu$), 4.3 (2H, $CH_2OCOCH=CH_2$), 6.42 (1H, $=CH_2$), 6.07 (1H, —$CH=CH_2$), 5.9 (1H, $=CH_2$).

White/pale yellow powders were obtained in high purity in a yield of 65%. The molecular weight and polydispersity was investigated by THF GPC using PS as calibration standards. Controlled molecular weight (Mn=2430 Da) and low polydispersity (PDI=1.1) were achieved.

To split off the tert-butyl protecting group under mild conditions, resulting in a carboxylic acid functionality, 0.5 g of the protected polymer (0.18 mmol) was dissolved in 6 ml $CH_2Cl_2$ under $N_2$. 2.1 g (18 mmol) of dry TFA was then added. The reaction was stirred overnight at room temperature. The solvent was reduced in vacuo and the polymer was precipitated from 300 ml of diethylether. Finally, the product is freeze dried and a white, fluffy powder is obtained. Substantial deprotection is achieved according to 1H NMR spectroscopy and the product was obtained in a yield of 80%. The high COOH functionalization of (>95%) of the oligomers was confirmed by $^{31}$P NMR spectra. The molecular weight and polydispersity were examined by THF GPC. The product retained a single molecular weight distribution (Mn=2380 Da) and low polydispersity (PDI=1.1).

The details of the obtained compound are shown in Table 2

TABLE 2 poly(2-ethyl-2-oxazoline) carboxyl acrylate obtained

| Sample ID | DP ($^1$H NMR) | Mn (GPC, Da) | PDI | COOH Functionality |
|---|---|---|---|---|
| POX-COOH | 20 | 2380 | 1.1 | >95% |

The compounds according to Formula (1) are then grafted to the magnetic particles by incubation in MeOH/TEA at 50° C. overnight.

Anti-Fouling Test

Fetal Bovine Serum (FBS) is prepared as follows. The FBS was obtained from SAFC, cat no. 12003c, stored in a bottle in a freezer, and allowed to thaw at room temperature or 4° C. After substantial thawing, the bottle of FBS was placed in a water bath at 56° C. for 30 minutes, with the bottle being shaken gently at 10 minute intervals. The bottle of FBS was then placed in an ice bath. Following cooling, it is stored at −20° C.

Four samples of magnetic particles are provided. The functionalized samples (CE 2-3 and Ex 4) were functionalized as described above; CE 1 are non-functionalized magnetic particles (see Table 4).

The magnetic particle samples were then prepared for analysis by using quantitative SDS-PAGE.

The samples of magnetic particle were first washed as follows. For each sample, the magnetic particles were placed in deionized water and the water exchanged for phosphate buffered saline (PBS). The samples were then placed in a magnetic particle concentrator (DynaMag™-2, Thermo Fischer Scientific) for 5 minutes and the supernatant removed. An additional 1 ml of PBS was then added and the samples vortexed for 2 to 5 minutes. The concentration and vortexing sequence was performed five additional times for each sample (6 times total).

PBS was then added to the samples to reach a final concentration of about 12.5 mg of magnetic beads per ml of solution. The samples were then incubated in the prepared FBS as follows. 50 µl of the magnetic particles in PBS (12.5 mg/ml) was added to 450 µl FBS 2% solution (FBS 50-fold diluted in PBS) and incubated for 1 hour at 22 to 24° C. using a Thermomixer (Eppendorf) (450 RPM).

The samples were then concentrated and washed as follows. Samples were placed in a magnetic particle concentrator (DynaMag™-2) for 5 min, and then washed using 1 ml PBS. The concentration and wash sequence was performed 5 additional times (6 times total). Between the fifth and sixth sequence the samples were transferred to new low-bind tubes. The supernatant of the last wash is kept for SDS-PAGE.

Next, 50 µl sample buffer mix (milliQ: NuPAGE™ LDS sample buffer (4×) Invitrogen: NuPAGE™ LDS sample buffer (4×) Invitrogen=65:25:10 v/v/v) was added to the particles and the samples were heated for 10 min at 70° C. in a Thermomixer (1000 RPM). Afterwards, the samples were placed in a magnetic particle concentrator (DynaMag™-2) for 5 minutes. The supernatant (without the particles) was applied on the SDS-PAGE gel.

A 65 µl FBS reference sample (diluted with PBS to 0.5%) and 65 µl DI water were also added to 25 µl NuPAGE™ LDS sample buffer (4×) (Invitrogen) and 10 µl NuPAGE™ Sample Reducing Agent (10×) (Invitrogen) and heated for 10 min at 70° C. in a Thermomixer (1000 RPM). This reference was then applied on SDS-PAGE gel.

For quantitation purpose, a calibration curve was made with bovine serum albumin (BSA) as follows. From a BSA solution of 1.0 mg/ml, six different dilutions were made: 0.10, 0.08, 0.06, 0.04, 0.02 and 0.01 mg/ml. 65 µl of the different BSA solutions was added to 25 µl NuPAGE™ LDS sample buffer (4×) (Invitrogen) and 10 µl NuPAGE™ Sample Reducing Agent (10×) (Invitrogen) and samples were heated for 10 min at 70° C. in a Thermomixer (1000 RPM).

5 µl of the sample solutions and 3 µl marker M12 (Invitrogen) were applied on NuPage 4-12% BisTris 17-well gels. The gels were run at 100 V for 10 min, 150 V for 10 min and 200V for 45 min using the Xcell Surelock Mini-Cell electrophoresis unit (Invitrogen), with 600 ml MOPS SDS running buffer in the outer chamber and 200 ml MOPS SDS running buffer (both buffers are dilutions from 20-fold concentrated solutions, Invitrogen), containing 0.5 ml of antioxidant (Invitrogen) in the inner buffer chamber. After running, the gels were fixed for 1 h with 50 ml of 50% methanol/7% acetic acid, rinsed twice with demineralized water and stained with 50 ml Sypro® Ruby gel staining solution for 4 h.

The gels were washed with demineralized water for 10 minutes and then imaged using the Typhoon 9200 (GE Healthcare) (610 BP 30, Green (532 nm), PMT 575V, 100 micron).

For each SDS-PAGE gel lane (both for BSA calibration standards and experimental samples), the total lane grey intensity was measured. Using the BSA standards, a calibration line was made and the concentration of proteins released from the particles during sample preparation (in mg/mL) in the experimental samples (on the same gel) was calculated accordingly. The quantification of the protein level for each sample is based on the assumption that BSA and the protein level of the sample had the same staining efficiency with Sypro®Ruby.

The results are presented in Table 4. Each sample was tested in triplicate and the results reported as an average. A calibration curve is accepted if 1) it was constituted of at least 4 standards, and 2) if for each standard, the bias with respect to the nominal concentration was within +/−15.0%. Only the sample concentrations that fell between the lowest and the highest BSA standards of an accepted calibration curve were calculated. Comparative experiment CE 1, the non-functionalized sample, is thus reported at >0.10 because its value fell far above the highest BSA standard calibration curve, which was 0.10 mg/ml.

TABLE 4

Experimental Results

| Sample | Functionalized with | Protein detected (mg/ml, BSA equivalents) | RSD |
| --- | --- | --- | --- |
| CE 1 | None | >0.10 | — |
| CE 2 | POX-1800 | 0.01 | 10.0% |
| CE 3 | POX-3600 | 0.06 | 2.8% |
| Ex 4 | POX-COOH | 0.05 | 11.2% |

Each of the modified magnetic beads is found to provide a decrease in non-specific protein binding with respect to the unmodified magnetic beads. The PDX-1800 modified magnetic beads show a greater than 10-fold improvement. The amount of protein adsorbed to the particles functionalized with PDX-3600 (Comparative experiment 3) and PDX—COOH (Example 4) is of a comparable level (i.e. about 5 times more adsorbed proteins than for PDX -1800). The PDX—COOH functionalization process is technically less complex to apply on industrial scale and thus more commercially viable, while providing a surface having suitable anti-fouling and specific binding properties.

The invention claimed is:

1. A method of attaching a polymer chain to a surface comprising the steps of:
   a. providing a surface comprising a moiety capable of nucleophilic conjugate addition, wherein said moiety is selected from the group consisting of a primary amine, a secondary amine and a SH group,
   b. providing a poly(2-oxazoline) compound having at least one endgroup, wherein said endgroup is selected from the group consisting of a (meth)acrylate, a (meth) acrylamide, and a thioester having a vinyl group,
   c. reacting the endgroup of the poly(2-oxazoline) compound with the moiety capable of nucleophilic conjugate addition under condition such that a conjugate addition reaction occurs between the moiety capable of nucleophic conjugate addition and the endgroup of the poly(2-oxazoline) compound, thereby forming via a conjugate addition reaction a polymer chain attached to the surface.

2. A method of attaching a polymer chain to a surface according to claim 1, comprising the steps of
   a. providing a surface comprising a moiety capable of nucleophilic conjugate addition wherein said moiety is selected from the group consisting of a primary amine, a secondary amine and a SH group,
   b. providing a poly(2-oxazoline) compound according to formula (1)

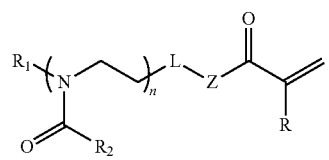

wherein n is from 2 to 200; R is H or $CH_3$; $R_1$ is H or comprises a hydroxyl endgroup, a carboxyl endgroup, an amine endgroup, an N-hydroxysuccinimide endgroup, an oxirane endgroup, an oxetane endgroup, an isocyanate endgroup, a tert-Butyl carbamate endgroup, a benzyl carbamate endgroup, a phthalimide endgroup, a p-toluenesulfonamide endgroup, a 9-fluorenylmethyl carbamate endgroup, a methyl ester endgroup, a t-butyl ester endgroup, a benzyl ester endgroup, a S-t-butyl ester endgroup, or comprises a specific binding moiety; $R_2$ is $CH_3$ or $CH_2CH_3$; L is an optional linking group; Z is NH, O, or S; and c. reacting the (meth)acrylate group of the compound according to formula (1) with the moiety capable of nucleophilic conjugate addition, under condition such that a conjugate additio reaction occurs between the moiety capable of nucleophilic conjugate addition and the (meth)acrylate group of the poly (2-oxazoline) compound thereby forming via a conjugate addition reaction a polymer chain attached to the surface.

3. The method according to claim 2, wherein $R_1$ is a hydroxyl endgroup, a carboxyl endgroup, an amine endgroup, an N-hydroxysuccinimide endgroup, an oxirane endgroup, an oxetane endgroup, or an isocyanate endgroup.

4. The method according to claim 3, further comprising the step of
d. attaching a specific binding moiety to the polymer chain via the hydroxyl, carboxyl, amine, N-hydroxysuccinimide, oxirane, oxetane, or isocyanate endgroup.

5. The method according to claim 2, wherein the poly(2-oxazoline) compound is a compound according to formula (2):

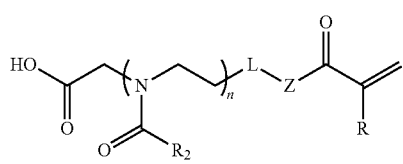

(2)

wherein n is from 2 to 200; R is H or $CH_3$; $R_2$ is $CH_3$ or $CH_2CH_3$; L is an optional linking group; and Z is NH, O, or S.

6. The method according to claim 2, wherein $R_1$ comprises a tert-butyl carbamate, a benzyl carbamate, a phthalimide, ap-toluenesulfonamide, a 9-fluorenylmethyl carbamate, a methyl ester, a t-butyl ester, a benzyl ester, or a S-t-butyl ester protecting group, and further comprising the step of:

forming an amine endgroup by removing the tert-butyl carbamate, the benzyl carbamate, the phthalimide, the p-toluenesulfonamide, or the 9-fluorenylmethyl carbamate protecting group, or forming a carboxyl endgroup by removing the methyl ester, the t-butyl ester, the benzyl ester, or the S-t-butyl ester protecting group.

7. The method according to claim 2, wherein L is absent and Z is O or NH.

8. The method according to claim 1, wherein the surface is the surface of a magnetic particle.

9. The method according to claim 1, wherein the number average molecular weight of the compound according to formula (1) is from 500 to 5,000 Da.

10. The method according to claim 1, wherein the moiety capable of nucleophilic conjugate addition is a primary amine group.

11. The method according to claim 5, wherein L is absent and Z is O or NH.

* * * * *

SEQUENCE LISTING

<160> NUMBER OF SEQ ID NOS: 16

<210> SEQ ID NO 1
<211> LENGTH: 4
<212> TYPE: PRT
<213> ORGANISM: Artificial sequence
<220> FEATURE:
<223> OTHER INFORMATION: Adhesive peptide fragment

<400> SEQUENCE: 1

Arg Gly Asp Ser
1

<210> SEQ ID NO 2
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 2

Gly Arg Gly Asp Ser
1               5

<210> SEQ ID NO 3
<211> LENGTH: 4
<212> TYPE: PRT
<213> ORGANISM: Artificial sequence
<220> FEATURE:
<223> OTHER INFORMATION: Adhesive peptide fragment

<400> SEQUENCE: 3

Gly Arg Gly Asp
1

<210> SEQ ID NO 4
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 4

Tyr Arg Gly Asp Ser
1               5

<210> SEQ ID NO 5
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 5

Tyr Arg Gly Asp Gly
1               5

<210> SEQ ID NO 6
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 6

Tyr Gly Arg Gly Asp
1               5

```
<210> SEQ ID NO 7
<211> LENGTH: 6
<212> TYPE: PRT
<213> ORGANISM: Artificial sequence
<220> FEATURE:
<223> OTHER INFORMATION: Adhesive peptide fragment

<400> SEQUENCE: 7

Gly Arg Gly Asp Ser Pro
1               5

<210> SEQ ID NO 8
<211> LENGTH: 6
<212> TYPE: PRT
<213> ORGANISM: Artificial sequence
<220> FEATURE:
<223> OTHER INFORMATION: Adhesive peptide fragment

<400> SEQUENCE: 8

Gly Arg Gly Asp Ser Gly
1               5

<210> SEQ ID NO 9
<211> LENGTH: 6
<212> TYPE: PRT
<213> ORGANISM: Artificial sequence
<220> FEATURE:
<223> OTHER INFORMATION: Adhesive peptide fragment

<400> SEQUENCE: 9

Gly Arg Gly Asp Ser Tyr
1               5

<210> SEQ ID NO 10
<211> LENGTH: 7
<212> TYPE: PRT
<213> ORGANISM: Artificial sequence
<220> FEATURE:
<223> OTHER INFORMATION: Adhesive peptide fragment

<400> SEQUENCE: 10

Gly Arg Gly Asp Ser Pro Lys
1               5

<210> SEQ ID NO 11
<211> LENGTH: 7
<212> TYPE: PRT
<213> ORGANISM: Artificial sequence
<220> FEATURE:
<223> OTHER INFORMATION: Adhesive peptide fragment

<400> SEQUENCE: 11

Cys Gly Arg Gly Asp Ser Tyr
1               5

<210> SEQ ID NO 12
<211> LENGTH: 11
<212> TYPE: PRT
<213> ORGANISM: Artificial sequence
<220> FEATURE:
<223> OTHER INFORMATION: Adhesive peptide fragment

<400> SEQUENCE: 12

Gly Cys Gly Tyr Gly Arg Gly Asp Ser Pro Gly
1               5                   10
```

```
<210> SEQ ID NO 13
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 13

Arg Gly Asp Ser Pro
1               5

<210> SEQ ID NO 14
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 14

Ala Ser Ser Lys Pro
1               5

<210> SEQ ID NO 15
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 15

Tyr Ile Gly Ser Arg
1               5

<210> SEQ ID NO 16
<211> LENGTH: 5
<212> TYPE: PRT
<213> ORGANISM: Artificial sequence
<220> FEATURE:
<223> OTHER INFORMATION: Adhesive peptide fragment

<400> SEQUENCE: 16

Ile Lys Val Ala Val
1               5
```